United States Patent [19]

Pepper, Jr.

[11] 4,302,011

[45] * Nov. 24, 1981

[54] VIDEO GAME APPARATUS AND METHOD

[75] Inventor: William Pepper, Jr., Bethesda, Md.

[73] Assignee: Peptek, Incorporated, Bethesda, Md.

[ * ] Notice: The portion of the term of this patent subsequent to Jan. 23, 1995, has been disclaimed.

[21] Appl. No.: 873,568

[22] Filed: Jan. 30, 1978

Related U.S. Application Data

[60] Division of Ser. No. 850,741, Nov. 11, 1977, Pat. No. 4,129,747, and a continuation-in-part of Ser. No. 717,192, Aug. 24, 1976, Pat. No. 4,071,691, and a continuation-in-part of Ser. No. 759,931, Jan. 17, 1977, abandoned, and Ser. No. 867,256, Jan. 5, 1978, Pat. No. 4,198,539.

[51] Int. Cl.³ .............................................. A63F 9/00
[52] U.S. Cl. ........................ 273/85 G; 273/DIG. 28; 178/19; 340/365 C
[58] Field of Search ............... 273/859, 138 A, 237, 273/101.2, DIG. 28, 313–315; 340/712, 723, 724, 725, 365 C, 365 R, 365 S; 178/19, 18, 30, 15

[56] References Cited

U.S. PATENT DOCUMENTS

| | | | |
|---|---|---|---|
| 3,591,718 | 7/1971 | Asano | 178/19 |
| 3,696,409 | 10/1972 | Braaten | 340/365 C |
| 3,728,480 | 4/1973 | Baer | 273/237 |
| 3,732,369 | 5/1973 | Cotter | 178/18 |
| 3,732,557 | 5/1973 | Evans et al. | 340/365 C |
| 3,778,058 | 12/1973 | Rausch | 273/DIG. 28 |
| 3,815,127 | 6/1974 | Blumke | 340/365 C X |
| 3,836,409 | 9/1974 | Cockerell | 340/365 C |
| 3,874,669 | 4/1975 | Ariano et al. | 273/85 G |
| 3,875,331 | 4/1975 | Hasenbalg | 178/18 X |
| 3,888,491 | 6/1975 | Bernard et al. | 273/237 |
| 3,916,099 | 10/1975 | Hlady | 178/18 |
| 3,983,322 | 9/1976 | Rodgers | 178/19 |
| 4,017,072 | 4/1977 | Kurtz | 273/1 E |
| 4,022,971 | 5/1977 | Rodgers | 178/19 |
| 4,071,691 | 1/1978 | Pepper, Jr. | 273/DIG. 28 |
| 4,115,931 | 9/1978 | Futhey | 35/9 B X |
| 4,156,928 | 5/1979 | Inose et al. | 273/DIG. 28 |

OTHER PUBLICATIONS

*Gametronics Proceedings;* vol. 1; Jan. 18–20, 1978; pp. 115–120.

Stuckert, P. E.; *IBM Technical Disclosure Bulletin;* vol. 14; No. 3; Aug., 1971; pp. 952–959.

*Primary Examiner*—Vance Y. Hum
*Attorney, Agent, or Firm*—Jim Zegeer

[57] ABSTRACT

A video game apparatus and method in which two-axis output signals are produced when a surface activated with X-Y excitation signals is touched by the human finger. The control surface has a configuration corresponding to the play area on the video display. The device has the ability to sense the presence or absence of the user's finger, as well as intensity of touch or pressure, thus adding further dimensions of control since the presence of the user's finger on the control surface can be used to activate the video display and present the user's playing implement, if that be the case, on the screen wherever it is touched to introduce a further element of surprise and excitement into the playing of video games.

11 Claims, 4 Drawing Figures

VIDEO GAME APPARATUS AND METHOD

RELATED APPLICATIONS

This application is related to and is a continuation-in-part of my Application Ser. No. 717,192, filed Aug. 24, 1976, now U.S. Pat. No. 4,071,691, issued Jan. 31, 1978 and entitled "Human-Machine Interface Apparatus"; and a divisional application thereof, Ser. No. 850,741, filed Nov. 11, 1977 entitled "Human-Machine Interface Apparatus" now U.S. Pat. No. 4,129,747; and is a continuation-in-part of my Application Ser. No. 759,931, filed Jan. 17, 1977 and entitled "System for Producing Electric Fields Having Predetermined Characteristics" now abandoned; and my Application Ser. No. 867,256, filed Jan. 5, 1978 now U.S. Pat. No. 4,198,539 and entitled "System for Producing Electric Fields Having Predetermined Characteristics", all of which are incorporated herein by reference in their entirety.

BACKGROUND AND BRIEF DESCRIPTION OF THE INVENTION

Video games currently on the market utilize various forms of potentiometric devices having control knobs, handwheels, levers, "joy sticks" or other manual input devices for performing the function of entering information, typically position information, into a video game chip. These typically require a grasping movement or action on the part of the users and a period of adjustment until the users have acclimated themselves to the required movements of the control instrumentality. There are, however, inherent limitations in the amount of excitement that can be generated by the use of such devices and the novelty of such games quickly wears off. Moreover, these devices do not admit of providing the user or each player with a replica of the playing field since the potentiometric device requires movement between two parts and a maintenance of a fixed relation between the two and hence does not have freedom of action over the "playing surface".

In my above-identified application Ser. No. 759,931, I disclose a human-machine interface which comprises a surface having a predetermined length and a reference point thereon. Electrodes at the lateral edges of the field establish low-level electric fields above the surface and along the predetermined length. The human finger is inserted in the field to touch a selected point on the surface and traverse a path therealong. The electric field, having a parameter that varies continuously along the predetermined length as a function of distance from a reference point, couples a signal into the human finger where touched thereby. A second surface is located in such a way relative to the first surface that when the user touches the first surface with his finger, an electrical signal is transmitted through the hand and coupled into the second surface. X and Y coordinates of excitation of the surface produce in the touching finger a component of the X oriented field, and a component of the Y oriented field as functions of the position of the detected finger where it touches the surface. A signal level detector is included for detecting the presence or absence of the operator's hand or finger at the "playing surface". These signals are converted into a utilization signal which is applied to a utilization device. In my application Ser. No. 867,256, filed Jan. 5, 1978, I disclose preferred linearization systems, and the use of a pressure sensitive device for translating touch pressure to a further control signal which is also applied to the utilization device.

The present invention is directed particularly to the incorporation of the human-machine interface disclosed in my above-identified applications into video games. The control surface when used as an input for video games is, preferably but not necessarily, a scaled linear model of the playing area. Touching it causes the paddle or other game feature to appear at the corresponding place on a video screen and takes the place of the standard potentiometers or other graspable implements used for communicating a player's action to the game. The size of the control surface can be made to accommodate any degree of scale reduction or enlargement of the playing surface disclosed in the video portion of the game. However, there are two sizes which seem natural and easily adapted for any use: a small size corresponding to the span of the forefinger with the heel of the hand resting on a support, which may constitute the second surface or input surface for the game and a larger, less clearly defined size for free movement of the entire hand where the second surface may be constituted by a ring or frame around the control surface. Preferences vary depending on physiological factors as small muscle control versus large muscle control or personality characteristics such as expansiveness versus preciseness. Pressure of the touching finger can be used as a further control signal.

One of the key problems of present-day controls or input instrumentalities for video games is the reliability of the controls themselves. Knobs come off, potentiometers fail, linkages bend, and levers break and this is particularly acute for arcade games which are plagued by vandalism and violet misuse. Efforts to alleviate these problems, such as incorporating clutches in the potentiometers, help somewhat, but the difficulties persist. The present invention therefore completely solves the mechanical reliability problem. Not only does it have no moving parts such as linkages, it has no projections at all and the control surface uses tough, durable, resistive materials developed for long life potentiometers. The failure mode limitations thus are those for ordinary solid state electronics.

The control surfaces can all be coplanar or, preferably, the pick-up surface can be above the control surface in a common housing.

The basic principle of operation consists of establishing an electric field over the control surface which electric field has a phase (or some other electrical parameter) varying as a function of position. When the user or player touches the surface, the signal at that point is capacitively coupled by his hand to the second and adjacent pick-up surface and the phase information is extracted from the signal. Time multiplexing utilizing the same circuitry gives output for both the X and Y axis. In addition to the foregoing, the presence or absence of the finger on the control surface can be used as a further input signal, and for this purpose a level detector connected to the output of the pick-up surface can be used to produce a binary signal to indicate the presence or absence of the finger on the control surface. Moreover, a pressure sensitive transducer may easily be combined with the control surface to introduce a further dimension to the game. Although the control surface and the pick-up surfaces are separately fabricated, they can both be produced from the same material if the impedance of the pick-up is small relative to the input impedance of the detection circuitry.

BRIEF DESCRIPTION OF THE DRAWINGS

The above and other objectives, advantages and features of the invention will become more apparent when considered in light of the following specification in the accompanying drawings wherein.

DETAILED DESCRIPTION OF THE INVENTION

There are currently available on the market a large number of video games in which standard monochrome or color television receivers are connected to game generator circuitry, typically in the form of microprocessors, which display and manipulate symbols or geometric figures upon the screen of the television receivers for the purposes of playing the games. See, for example, Rausch U.S. Pat. No. 3,778,058, Dash et al U.S. Pat. No. 4,034,983 and Bayer U.S. Pat. No. 4,034,990. These are typical examples of apparatus for playing games on video screens wherein the players are each provided with their own control ensemble which in the present invention is defined as the player's unit. Very often, the game itself is basically a programmed microprocessor, three typical examples being Texas Instruments SN76410 "Universal Game Chip", National Semiconductor SC/MP Microprocessor, and Texas Instruments "Twenty Game Space War" Game Chips. These devices typically include circuitry for generating video control signals for the game such as a hockey puck, players on the field which are manipulatable by the player's control unit, scoring display and sound generation. The present invention is not concerned with the details of the circuitry of such systems but with the incorporation of the control surface disclosed in my patent application Ser. No. 717,192 and in my patent application Ser. No. 850,741 in video game apparatus. Linearization of the fields is as disclosed in my application Ser. No. 867,256, filed Jan. 5, 1978 and entitled "System for Producing Electric Fields Having Predetermined Characteristics".

Figure 1:
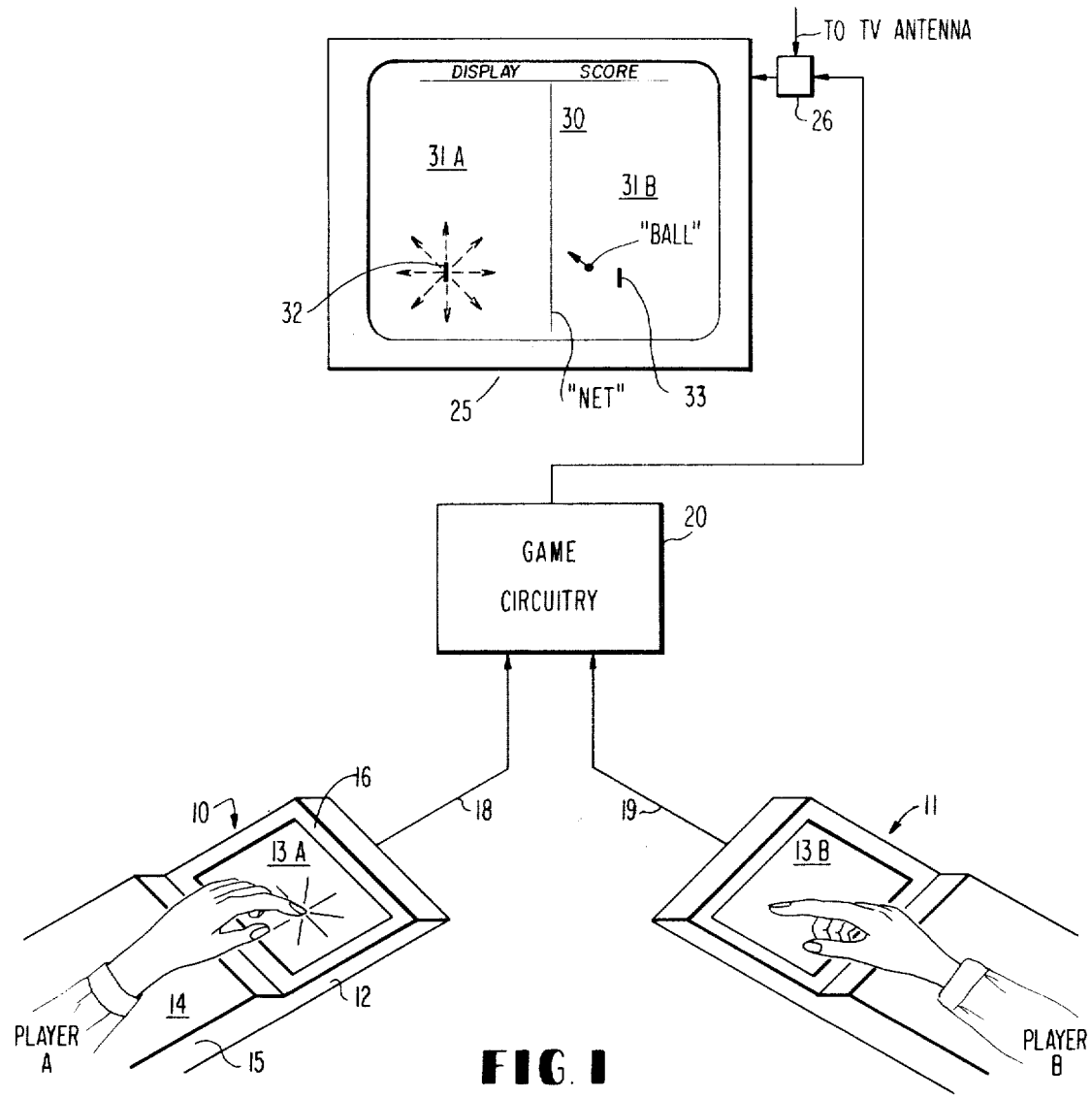
FIG. 1 is a schematic-pictorial block diagram illustrating the invention as applied to a two-player video game.

As shown in FIG. 1, there is a player's unit 10 for player A and a player's unit 11 for player B. There are some video entertainment systems in which a single player is involved, in which case only one player unit is required. Each player's unit 10 and 11 is identical and will be described in connection with player's unit 10 for player A, it being understood that the same description applies to player's unit 11 for player B. Each player's unit includes a housing 12, a player's playing surface 13 and a pick-up surface 14 and associated signal producing circuitry internally housed in housing 12. Playing surface 13 is the exposed resistive surface of a human-machine interface apparatus as disclosed in my above-identified U.S. Pat. No. 4,071,691 and linearized in my application Ser. No. 867,256, filed Jan. 5, 1978 and entitled "System for Producing Electric Fields Having Predetermined Characteristics". Player's playing surface 13 is framed as at 16 by a portion of the housing and while it is shown as being rectangularly shaped so as to be a simulation of typical playing surfaces such as basketball, football, tennis Ping-Pong, hockey, etc., other geometrical configurations, including circular as well as non-planar, may be utilized. The pick-up surface 14, in the preferred embodiment, is mounted in a pedestal 15 on housing 12 so that the surface 14, which preferably is a fixed conductive plate, is above the surface 13. This advantageously permits easy movement of the finger over the playing surface 13 without too much movement of the hand of player A, for example. It is, of course, entirely feasible to having the playing surface 13 coplanar with pick-up surface 14 or even above playing surface 14, if that be desired. However, as indicated above, in the preferred embodiment the pick-up surface 14 is above the player's playing surface 13.

Player A's finger touching playing surface 13 with player A's palm or hand on or above pick-up surface 14 permits the generation of an analog signal relative to a fixed point on playing surface 13 such that it changes continuously along an axis of the surface so that when the player inserts his finger in the field to touch the surface, the phase corresponding to the point of insertion is transmitted through the player's hand to pick-up surface 14. As disclosed in my above-identified patent application, a phase discriminator with one input connected to the pick-up surface and a reference input connected to an alternating voltage of predetermined phase relative to the alternating electric field at a fixed point on the phase surface is used to develop an analog signal which is directly proportional to the position of the player's finger on the player's surface. X-Y excitation of the resistive surface, either at different frequencies or through a multiplexing operation, permits the precise position of the player's finger on the playing surface to be determined in full equivalence of two axis potentiometers currently in use such as in "joy sticks" and the like. Of course, if only a single axis is desired, this may easily be accommodated as disclosed in my U.S. Pat. No. 4,071,691. A level detector provides a third output indicating the presence of the operator's finger in the field and, if desired, the pressure or intensity of the operator's finger on the playing surface may be converted to an electrical signal as disclosed in my application Ser. No. 867,256, filed Jan. 5, 1978 and entitled "System for Producing Electric Fields having Predetermined Characteristics".

These signals are produced on output line 18 and coupled to the game chip circuitry 20. Game circuitry 20, which can be and/or includes any of the above-identified video game chips and/or video game or educational apparatus as disclosed in the above-identified patent, converts the player's signals to display information for a video screen.

Typically, the output of the game circuit is by a 75 ohm coaxial to the antenna terminals (not shown) of a television set 25. If necessary, a coupler 26 having conventional switching and impedance matching circuitry connects the television set 25 to the game chip circuitry 20 or to the outside TV antenna for reception of conventional television signals and conventional television usage.

In the present case, television screen 30 is used for presenting the display of the game being played and, in the preferred embodiment herein, a player's playing surface 13 is a replica to scale of the playing surface which is depicted or projected upon video screen 30. If it was a tennis game, for example, a line 31 may be projected upon the screen so as to constitute the net of the game, along with a rectangular outline of the tennis court. The usual scoring display and sound effects (not shown) are also supplied to the television set 25 from game circuitry 20. Each of the player's paddles, herein denoted the player's game element, are indicated at 32 for player A and 33 for player B. A "ball" or "puck" or other game unit is depicted as having been struck by player B's game element and moving toward the net and player A's side of the tennis court. Player A may move his finger in all directions on his playing surface as indicated by the arrows on playing surface 13. Player A's game element 32 will move in corresponding directions on his side 31A of the playing surface as depicted on video screen 30. In like manner, player B's game element 33 will move to all positions on player B's playing surface 31B corresponding to the positions of player B's finger on his corresponding playing surface 13B of player unit 11. It will be appreciated that the playing surfaces 13 may have overlays in the form of plastic or projected images (see FIG. 4 herein) to change the simulation of playing surface 13 to correspond to the game being played. Typically, the game may be varied widely such as the game cartridges widely used in various video game systems such as such manufacturers as Atari, Fairchild, RCA, Magnavox, etc.

In addition, if the game chip is of the type which requires the firing of a missile or like object controlled by the player at his player's unit, a switch (not shown) may be incorporated in the pick-up surface 14 so that the player may "fire his weapon" by pressing down with the palm of his hand. Alternatively, the surface 13 may include a pressure sensing system (not shown) (as disclosed in my application Ser. No. 867,256, filed Jan. 5, 1978) such that when the pressure exceeds a certain level the player's "gun" fires. The typical gun firing circuitry per se and the like, as indicated above, form no part of the present invention other than that they may be controlled by the apparatus disclosed herein.

Figure 2:
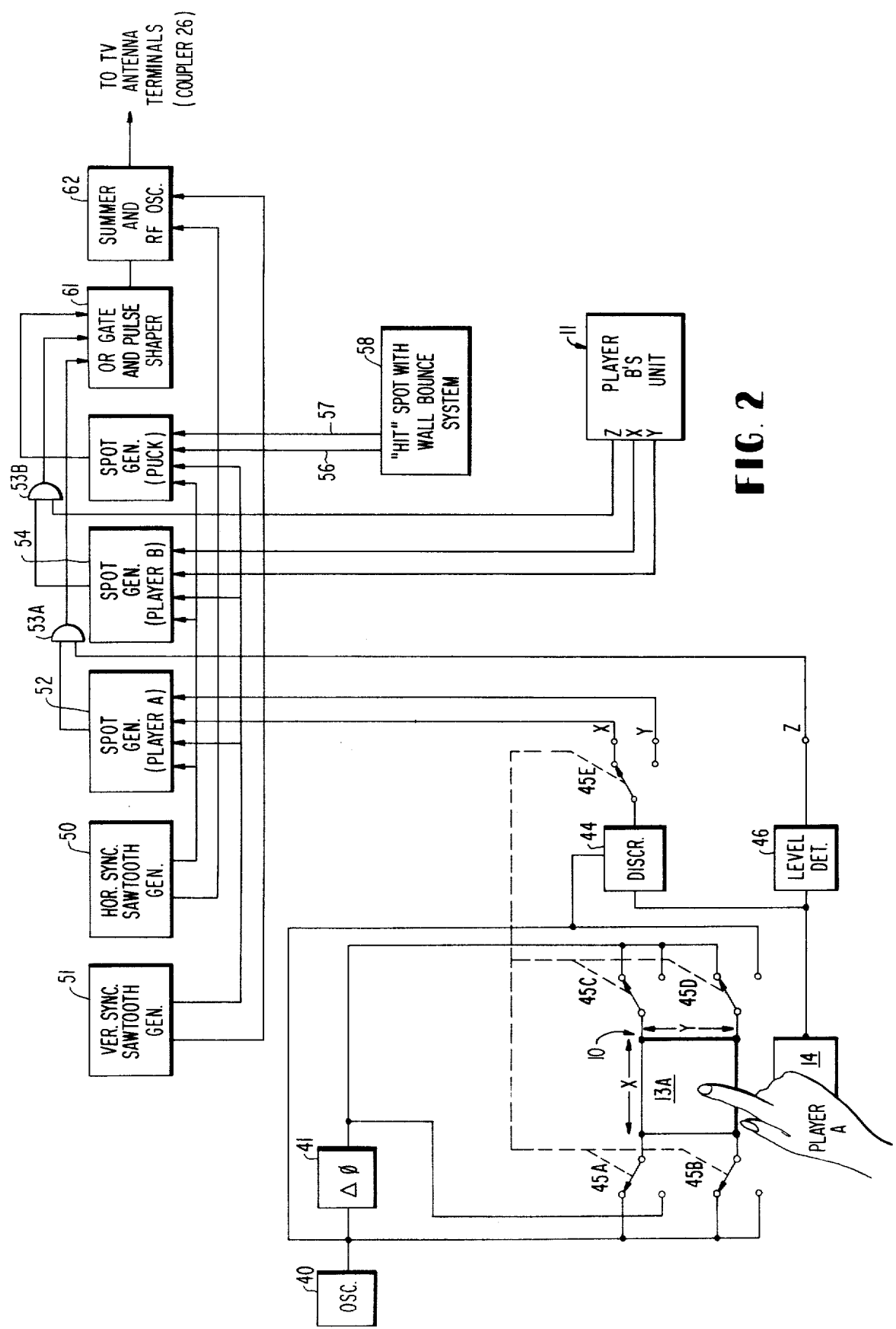
FIG. 2 is a schematic block diagram illustrating a typical video game which two players' units are connected to a typical block diagram of apparatus for a simulated hockey game (as taken from Rausch U.S. Pat. No. 3,778,058)

In FIG. 2, there is disclosed a detailed circuit block diagram illustrating the playing of a hockey game and for particular details of the circuitry reference is made to my above-identified U.S. Pat. No. 4,071,691. For a detailed description of the "game" per se, reference is made to Rausch U.S. Pat. No. 3,778,058 and particularly the description in that patent of its FIG. 14.

Briefly described, the playing surface 13 for player A is a resistive surface 42 having X and Y coordinates of position with respect to selected edges thereof which via switching circuitry 45A, 45B, 45C and 45D are alternately excited from oscillator 40 and phase shift circuitry 41. As illustrated, the excitation is alternately along the X axis and the Y axis. This circuitry is similar to FIG. 6 of my above-identified U.S. Pat. No. 4,071,691. As therein described, in this embodiment, multiplexing is used instead of two separate or duplicate oscillators with phase shifters and discriminators. An alternating voltage is generated by oscillator 40 and shifted 90 degrees in phase by phase shifter 41. The two signals are applied to opposite sides of phase surface 42 (which is the player's playing surface 13) and linearized as disclosed in my subsequent application Ser. No. 867,256, filed Jan. 5, 1978.

Player's pick-up surface 14 is an electrode or a metal plate 43 which picks up the signal from the hand of the player and couples same to discriminator 44. Discriminator 44 receives an input from oscillator 41 and a second input from pick-up plate 43 and recovers the phase information from the signal. Switch 45 multiplexes the circuitry by first connecting the two input signals to the phase surface so as to produce a phase field along the X axis, and simultaneously connects the discriminator output to the X output connection, and then connecting the input signals of the phase shifter to the Y axis of the phase surface and the discriminator output to the Y output connection. Level detector 46 detects the presence or absence of the operator's hand. The X and Y signals are applied to the spot generator 1 for player A. The vertical and horizontal sync sawtooth generators 50 and 51, the spot generator 52 for player A, are as described in U.S. Pat. No. 3,778,058. In accordance with the present invention, the output of spot generator 52 for player A is coupled through AND gate 53 which requires as a second input the output from level detector 46. The control voltages to the horizontal and vertical slicers of the spot generator 52 for player A are obtained from the outputs of the X and Y outputs of discriminator 44. Spot generator 54 for player B is derived in the same manner as the X and Y signals for player A. The control signals for the horizontal and vertical slicers of the spot 3 or puck generator are obtained at the outputs 56 and 57 of "hit" spot with wall bounce system generator 58. The inputs to hit spot with wall bounce system 58 are the X and Y inputs from player unit A and from player unit B. With two players, a puck which moves in a direction of a hit, gives the effect of the hockey game results as depicted on the TV screen. The outputs of spot generators 52 as applied via AND gate 53 and spot generator 54 as applied via AND gate 55 are coupled along with the output to a summer and RF oscillator 62. Note that both the vertical and horizontal sync sawtooth generators are coupled to summer 63 and these signals are coupled to the TV antenna terminals for a display of the game being played.

Figure 3:
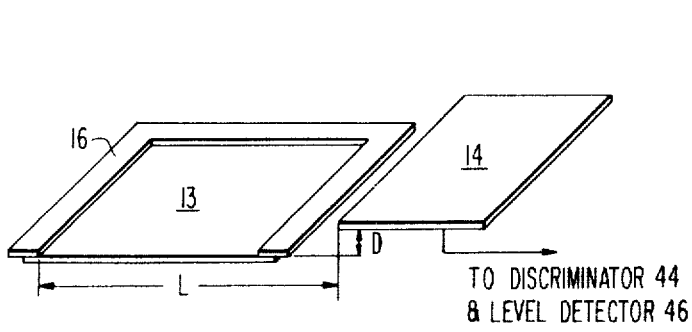
FIG. 3 is an isometrical sectional view diagrammatically illustrating the preferred relative position of the pick-up surface and playing surface in a player's unit.

Referring now to FIG. 3, the player unit illustrated in FIG. 2 is shown in partial isometric cross section wherein the frame 14 is shown as masking the borders of playing surface 13A. The pick-up surface 14 is shown as being physically above the playing unit 13A by distance D and that the leftmost edge of surface 14 is spaced from the most remote portion of surface 13A by a distance L. This permits the palm or wrist of the player to rest on surface 14 and still reach with ease the most remote points on the playing surface 13A.

Figure 4:
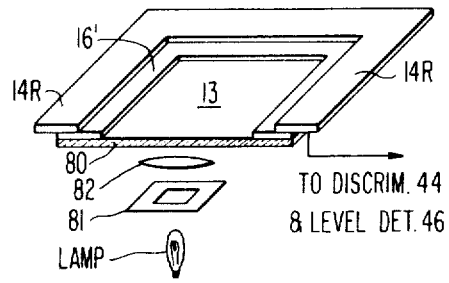
FIG. 4 is an isometric sectional view diagrammatically illustrating a further preferred relative positioning of the pick-up surface and the playing surface and incorporating the feature of modifying the visual presentation of the playing surface.

In FIG. 4, the pick-up surface is illustrated as a rectangular frame 14R which completely surrounds the player's surface 13. In this case, the masking surface 16 can, if desired, be incorporated or eliminated as a part of playing surface 13 provided, of course, it is insulated from playing surface 13. As described earlier herein, a transparent plastic overlay or sheet may be positioned over surface 13A so as to change the simulation of the playing field to the user, the playing surface 13A may be formed of a transparent resistive material which is carried on a transparent plate, such as a glass plate 80, and an image from a slide 81 may be projected through a lens 82 upon the rear surface of support plate 80 to thereby change the representation of the playing surface. Of course, other means of optically combining a simulated image of a playing surface may be used if desired.

It will be seen from the foregoing description that the various objectives and advantages of the invention have been achieved.

What is claimed is:

1. In a video game system having an electronic display, electronic game generator means for generating control signals for said visual display according to the game being played, at least one player controlled signal generator, said electronic game generator means having at least one player controlled signal input means for receiving control signals from said player controlled signal generator, the improvement comprising;
    at least one player touchable surface,
    electric means for exciting said surface from pairs of orthogonally oriented edges thereof so as to produce a position signal field which varies linearly in a given parameter as a function of distance from one of said edges so that a player's finger on said at least one player touchable surface generates a position signal therefrom,
    means for detecting said position signal generated by the player's finger and applying same to said at least one player controlled signal input means of said electronic game generator.

2. The invention defined in claim 1 wherein, said touchable surface includes means for changing the replica of the playing area of said game of said player touchable surface to correspond to the electronic game being played and the position of the player's finger on said player touchable surface produces control signals for causing dynamic positioning of the player's game element in said visual display at the corresponding position in said replica.

3. The invention defined in claim 1 wherein said player touchable surface is a resistive surface, said system including a conductive surface adjacent said resistive surface for receiving at least a portion of the signal coupled to the player's finger and supplying same to input means.

4. The invention defined by claim 3 wherein one of said surfaces surrounds the other of said surfaces.

5. The invention defined in claim 1 including means combined with said player touchable surface for changing the visual appearance of said surface to correspond with the video game being played.

6. In an electronic game method having a video screen on which a primary playing area simulation is electronically produced with related player controlled game elements pictorially shown on said video screen, and player controlled means coupled to electrical circuits for producing coordinates of position for said player controlled game elements, the improvement comprising:
    providing a secondary playing area simulation in the form of a player finger touchable impedance surface, said player finger touchable impedance surface having at least one reference edge and producing an electrical signal upon being touched which signal is proportional to the distance of the position touched from said reference edge of said secondary playing area simulation, and
    controlling the position of said game element in accordance with the coordinates of position of the player's finger on said secondary playing area simulation.

7. The electronic game method defined in claim 6 wherein said secondary playing area simulation is orthogonally excited by signals whose phase varies linearly with distance from the respective reference edges to delineate X-Y coordinates of position on said secondary playing area simulation, and
    said position of said player's game element is controlled as a function of the X-Y coordinates of position of the player's finger where it touches the surface of said secondary playing area simulation.

8. The electronic game method defined in claim 6 including the step of sensing the pressure of the player's finger on said secondary playing area and producing a control signal for said video game.

9. In a video game system having an electronic display, electronic game generating means for generating control signals for said visual display according to the game being played including at least one player controlled game element, at least one player controlled signal generator, said electronic game generating means having input means for receiving control signals from said player controlled signal generator and controlling the position of said game element in said visual display, the improvement in said player controlled signal generator comprising:
    at least one player touchable electrically conductive surface, said at least one player touchable electrically conductive surface being a replica of the playing area of said game and adapted to be touched by one or more player's finger,
    means for electrically sensing the position of said player's finger on said electrically conductive player touchable surface and producing a position signal corresponding thereto which position signal is applied to said at least one player control signal input means of said electronic game generator so as to control the position of the player's game element in said visual display.

10. In an electronic game method utilizing an electronic game apparatus having a display screen on which a primary playing area is electronically produced and player operated remote control units produce electrical signals corresponding to hand motions of the player improvement in said method comprising eliminating the requirement for grasping and causing relative mechanical manipulation between structural elements and allowing more natural and convenient two axis motions without mental translation by the player,
    providing at least one player touchable electrically conductive surface,
    said player touchable electrically conductive surface being adapted to be touched by a player,
    sensing the position touched by the player on said electrically conductive player touchable surface to produce a position signal voltage corresponding thereto which position signal voltage is utilized in said electronic game apparatus for providing the player's input to the game in the absence of relative mechanical motion between structural elements.

11. The electronic game method defined in claim 10 wherein the position touched by said player is translated to a pair of analog voltages corresponding to the X and Y coordinates of position of the player's finger where it touches the control surface relative to the edges of said control surface.

* * * * *